No. 734,033.

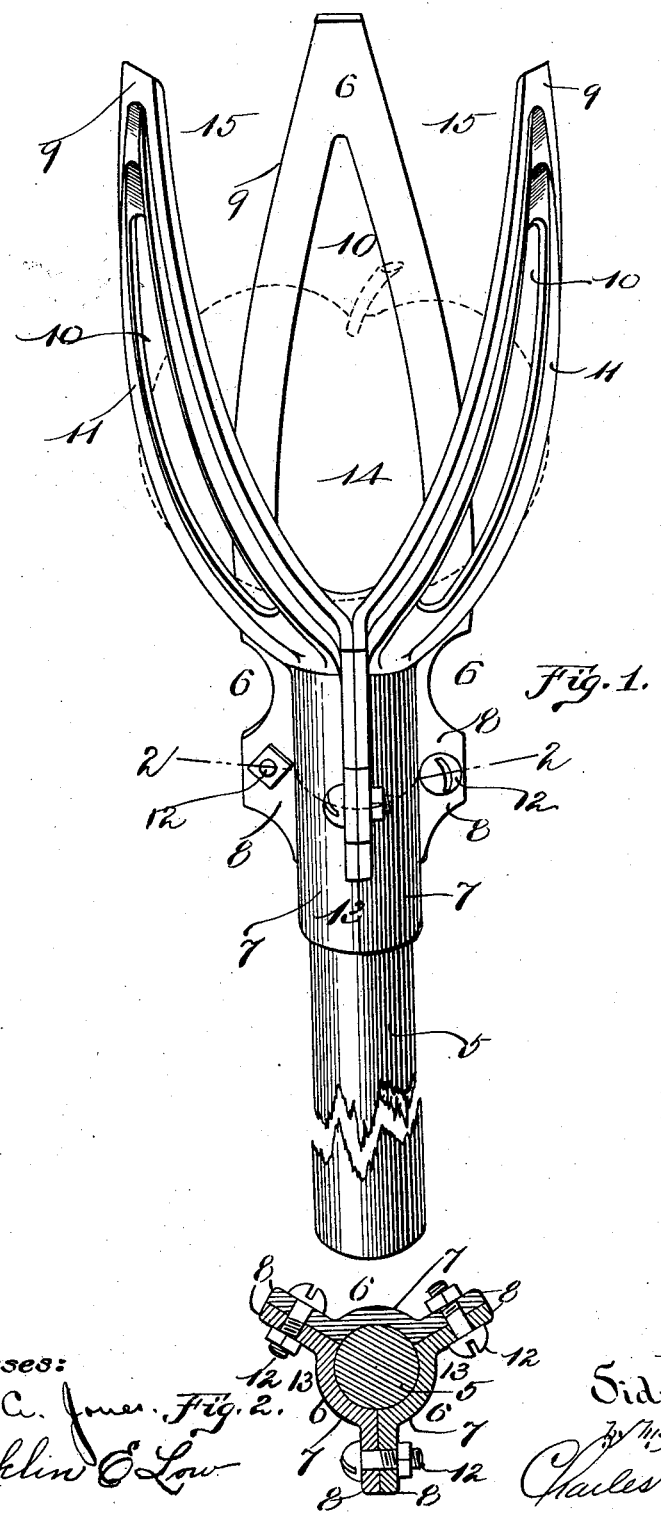

Patented July 21, 1903.

UNITED STATES PATENT OFFICE.

SIDNEY H. ALDEN, OF NORTH MIDDLEBORO, MASSACHUSETTS.

FRUIT-PICKER.

SPECIFICATION forming part of Letters Patent No. 734,033, dated July 21, 1903.

Application filed September 6, 1902. Serial No. 122,374. (No model.)

*To all whom it may concern:*

Be it known that I, SIDNEY H. ALDEN, a citizen of the United States, residing at North Middleboro, in the county of Plymouth and State of Massachusetts, have invented new and useful Improvements in Fruit-Pickers, of which the following is a specification.

The object of this invention is to provide a simple, cheap, and durable device for picking fruit, such as apples, pears, and the like.

The invention consists in a fruit-picker comprising a plurality of sections so formed as to be adapted to be clamped one to the other and when so clamped forming as a whole a cylindrical sleeve with a plurality of outwardly and upwardly extending arms thereon, said arms converging from the extreme upper end of said cylindrical sleeve.

The invention further consists in the combination and arrangement of parts set forth in the following specification and particularly pointed out in the claims thereof.

Referring to the drawings, Figure 1 is a perspective view of my improved fruit-picker. Fig. 2 is a transverse section taken on line 2 2 of Fig. 1.

Like numerals refer to like parts throughout both views of the drawings.

In the drawings, 5 is a pole of any desirable length broken away to save space in the drawings.

6 6 6 are sections preferably cast of malleable iron. Each of the sections 6 consists of a portion 7 of a hollow cylindrical sleeve and is provided with two flanges 8 8, integral with the portion 7 and extending longitudinally thereof adjacent to the sides of said portion 7.

Each of the sections 6 has an arm 9 integral therewith and extending upwardly and outwardly from the upper end of the portion 7. The arms 9 are each provided with holes 10 for the purpose of lightening the same and with ribs 11 to strengthen them. The sections 6 are preferably three in number and are clamped together and to the pole 5 by bolts 12 12. When the sections are bolted together, as shown in the drawings, the different cylindrical portions 7 form a hollow cylindrical sleeve 13, which encircles and is clamped to the pole 5, and the curved arms 9 form a hollow receptacle 14 to receive the fruit. It will be observed that the arms 9 are pointed, the opposite sides of each section converging upwardly, thus making a large space 15 between the arms to receive the limb of the tree while the fruit is being removed therefrom by the picker. It will further be seen and understood that the adjacent edges of two adjacent arms diverge from a common point at the top of said sleeve 13.

The operation of the device is as follows: The operator raises the picker by means of the pole 5 until the desired fruit enters the receptacle, as shown in dotted lines, Fig. 1, the limb lying in one of the spaces 15 between the arms 9. He then moves the picker horizontally, and the fruit is severed from the limb and remains in the receptacle, when it is removed by the operator.

While I have shown and described my improved fruit-picker as formed in three sections, said sections being castings, it is evident that said sections may be formed of wire having a cylindrical sleeve portion and upwardly and outwardly extending arms converging from the extreme upper end of said sleeve without departing from the spirit of my invention.

Having thus described my invention, what I claim, and desire to secure by Letters Patent, is—

1. As an article of manufacture, a fruit-picker comprising a plurality of sections adapted to be clamped together and forming, when so clamped, a cylindrical sleeve, and an arm integral with each of said sections and extending upwardly and outwardly from the extreme upper end thereof.

2. As an article of manufacture, a fruit-picker, comprising a plurality of sections fastened together, each of said sections consisting of a portion of a hollow cylindrical sleeve, with flanges extending longitudinally of the periphery of said sleeve, together with an arm integral with said hollow cylindrical sleeve portion and extending upwardly and outwardly from the extreme upper end thereof.

3. As an article of manufacture, a fruit-picker, comprising a plurality of sections fastened together, each of said sections consisting of a portion of a hollow cylindrical sleeve, with flanges extending longitudinally of the periphery of said sleeve, together with a curvilinear arm integral with said hollow cylindrical sleeve portion extending upwardly and outwardly from the extreme upper end thereof, the opposite edges of said arm converging from said cylindrical sleeve portion.

4. As an article of manufacture, a fruit-picker, comprising a plurality of sections adapted to be clamped together and forming, when so clamped, a cylindrical sleeve, and an arm integral with each of said sections and extending upwardly and outwardly from the extreme upper end thereof, the adjacent edges of two adjacent arms diverging from a common point at the top of said sleeve.

5. As an article of manufacture, a fruit-picker, comprising a pole, a plurality of sections, each of said sections consisting of a portion of a hollow cylindrical sleeve, with flanges extending longitudinally of the periphery of said sleeve, together with a curvilinear arm integral with each of said sections, extending upwardly and outwardly from the extreme upper end thereof, the opposite edges of said arms converging from said sleeve, and bolts extending through said flanges and clamping said sections together and to said pole.

In testimony whereof I have hereunto set my hand in presence of two subscribing witnesses.

SIDNEY H. ALDEN.

Witnesses:
CHARLES S. GOODING,
ANNIE J. DAILEY.